United States Patent [19]

Bartosek

[11] 4,423,570

[45] Jan. 3, 1984

[54] APPARATUS FOR DRESSING AND ADJUSTING A GRINDING WHEEL AT A TOOTH FLANK-GRINDING MACHINE

[75] Inventor: Milan Bartosek, Fahrwangen, Switzerland

[73] Assignee: Maag Gear-Wheel & Machine Company Limited, Zürich, Switzerland

[21] Appl. No.: 362,874

[22] Filed: Mar. 29, 1982

[30] Foreign Application Priority Data

Apr. 27, 1981 [CH] Switzerland ............... 2725/81

[51] Int. Cl.³ .................................... B24B 49/18
[52] U.S. Cl. ........................ 51/165.88; 125/11 CC; 125/11 B; 125/11 R
[58] Field of Search .......... 125/11 R, 11 CC, 11 CD, 125/11 NT, 11 T, 11 B; 51/165.87, 165.88

[56] References Cited

U.S. PATENT DOCUMENTS

| | | | |
|---|---|---|---|
| 4,143,637 | 3/1979 | Mesey | 125/11 CC |
| 4,203,260 | 5/1980 | Fivian | 51/165.88 |
| 4,213,277 | 7/1980 | Fivian | 51/165.88 |

Primary Examiner—Harold D. Whitehead

Attorney, Agent, or Firm—Werner W. Kleeman

[57] ABSTRACT

An apparatus for dressing and adjusting a dished or plate-shaped grinding wheel at a tooth flank-grinding machine for a gear has an adjustable grinding wheel support at which there is mounted the grinding wheel, and a dressing carriage which is adjustable radially with respect to the grinding wheel. Arranged at the dressing carriage diametrically opposite the work location at which there is effective the grinding wheel upon a tooth flank, is a dressing tool for the working or effective end surface of the grinding wheel and a dressing tool for the outer jacket or peripheral surface of the grinding wheel as well as a feeler for scanning the working end surface. The adjustment direction of the grinding wheel support encloses an acute angle $\gamma$ with the adjustment direction of the dressing carriage, this acute angle coinciding with the inclination of the rear surface of the grinding wheel, and the grinding wheel axis encloses with the adjustment direction of the grinding wheel support the complementary angle $90° - \gamma$. The adjustment path of the dressing carriage in relation to the adjustment path of the grinding wheel support satisfies the equation:

$$c:b = 2 - \cos \gamma.$$

2 Claims, 4 Drawing Figures

APPARATUS FOR DRESSING AND ADJUSTING A GRINDING WHEEL AT A TOOTH FLANK-GRINDING MACHINE

BACKGROUND OF THE INVENTION

The present invention relates to a new and improved construction of apparatus for dressing and adjusting or readjusting, conveniently simply referred to herein as adjusting, a plate-shaped or dished grinding wheel at a tooth flank-grinding machine for a gear.

Generally speaking, the apparatus for the dressing and adjustment of the dished grinding wheel comprises an adjustable grinding wheel support at which there is mounted the grinding wheel. There is also provided a dressing carriage or slide which can be adjusted essentially radially with respect to the grinding wheel. At the dressing carriage there are arranged, at least approximately diametrically with respect to the work or active location at which the grinding wheel acts upon a tooth flank, two dressing tools. One of the dressing tools serves for dressing the working or active end surface or region of the grinding wheel and the other dressing tool serves for dressing the outer jacket or peripheral surface of the grinding wheel. At the dressing carriage there is also arranged a feeler for scanning the working or active end surface or region of the grinding wheel. A drive serves for adjusting the grinding wheel support and the dressing carriage, and the adjustment path of the dressing carriage is always greater than the adjustment path of the grinding wheel support. There is also provided a control for the drive and which is dependent upon the feeler.

With a prior art apparatus of this type, for instance as disclosed in German Patent Publication No. 2,934,345 and in the commonly assigned, copending U.S. application Ser. No. 06/127,368, filed Mar. 4, 1980, the grinding wheel support is guided at a support or carrier member in such a manner that the grinding wheel mounted upon the grinding wheel support, during displacement of the grinding wheel support, is adjusted radially, in other words at right angles to its axis. Additionally, the grinding wheel is axially feedable or adjustable in relation to the grinding wheel support. There is thus differentiated between an axial feed or advance movement and a radial adjustment of the grinding wheel. The axial feed ensures that the working or active end surface or region of the grinding wheel always remains in the same reference plane, notwithstanding repeated dressing operations performed at the grinding wheel, whereas by means of the radial adjustment of the grinding wheel there is compensated for its reduction in diameter which arises by virtue of the fact that the outer jacket or peripheral surface of the grinding wheel likewise must be periodically dressed, in order that it does not fall below a predetermined minimum width which precludes crumbling of the edge of the grinding wheel. The dressing carriage of the prior art type of apparatus discussed above is adjustably guided at the grinding wheel support parallel to its adjustment direction. The drive for adjusting the grinding wheel support and the dressing carriage is constructed such that the dressing carriage, in relation to the support member at which there is guided the grinding wheel support, always moves through twice as large an adjustment path as the grinding wheel support.

With such heretofore known equipment there must be established between the axial feed or advance of the grinding wheel and the radial adjustment of the dressing carriage such a relationship that the outer jacket or peripheral surface of the grinding wheel maintains a predetermined width within certain tolerance limits. Otherwise, exceeding this width could, during grinding of a tooth flank, lead to an impermissible contact of the grinding wheel with the neighboring tooth flank, whereas upon falling below such predetermined width it would be possible for the grinding wheel to crumble at its edge. This problem can be solved in known manner, for instance as disclosed in the German Patent Publication No. 2,644,890 and the corresponding U.S. Pat. No. 4,143,637, granted Mar. 13, 1979 in that, measuring devices serve to measure the axial feed of the grinding wheel and the radial adjustment of the dressing carriage and a control device controls a drive for the radial adjustment movement of the dressing carriage in a manner such that the ratio of such radial adjustment movement to the axial feed or advance movement of the grinding wheel corresponds to the tangent of the inclination of the rear surface of the grinding wheel in relation to its axis. However, the measuring and control devices needed for this purpose are quite complicated.

SUMMARY OF THE INVENTION

Therefore, with the foregoing in mind it is a primary object of the present invention to provide a new and improved construction of apparatus for dressing and adjusting a grinding wheel at a tooth flank-grinding machine for a gear, which is not associated with the aforementioned drawbacks and limitations of the prior art proposals.

Another and more specific object of the present invention aims at accomplishing and controlling in a simpler manner the movements at an apparatus of the aforementioned type and which are needed in order to maintain the grinding wheel sharp and to always bring such grinding wheel from a new into a predetermined position in relation to the tooth flank which is to be ground.

Still a further significant object of the present invention is directed to a new and improved construction of apparatus for dressing and adjusting a grinding wheel at a tooth flank-grinding machine for a gear, which apparatus is relatively simple in construction and design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the apparatus of the present development is manifested by the features that the dressing carriage is guided separately from the grinding wheel support upon a support or carrier member. The adjustment direction of the grinding wheel support encloses with the adjustment direction of the dressing carriage an acute angle $\gamma$ which opens towards the axis of the grinding wheel, this angle at least approximately coinciding with the inclination of the rear surface of the grinding wheel in relation to a radial plane. The grinding wheel axis encloses with the adjustment direction of the grinding wheel support the complementary angle $90° - \gamma$, and the adjustment path c of the dressing carriage in relation to the adjustment path b of the grinding wheel support satisfies the relationship:

$$c:b = 2 \cdot \cos \gamma.$$

Above all, the inventive apparatus affords the advantage that an axial adjustment of the grinding wheel in relation to the grinding wheel support is not required in any event during normal operation, so that the grinding wheel can be non-displaceably mounted upon the grinding wheel support. Due to the adjustment of the grinding wheel support itself there is compensated, on the one hand, the wear which arises by virtue of the grinding operation and the dressing at the end surface of the grinding wheel and, on the other hand, the diameter reduction of the grinding wheel which occurs due to the dressing of the jacket or peripheral surface or region. Since consequently, apart from controlling the adjustment of the dressing carriage, it is only necessary to control the adjustment of the grinding wheel support, and since the adjustment paths of the dressing carriage and the grinding wheel support are in a ratio or relationship to one another which is accommodated to the inclination of the rear surface of the grinding wheel, there is rendered particularly simple the construction of the inventive apparatus and its control.

Preferably, the adjustment direction of the grinding wheel support extends at least approximately parallel to that generatrix of the rear surface which neighbors most closely the work or active location of the grinding wheel.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
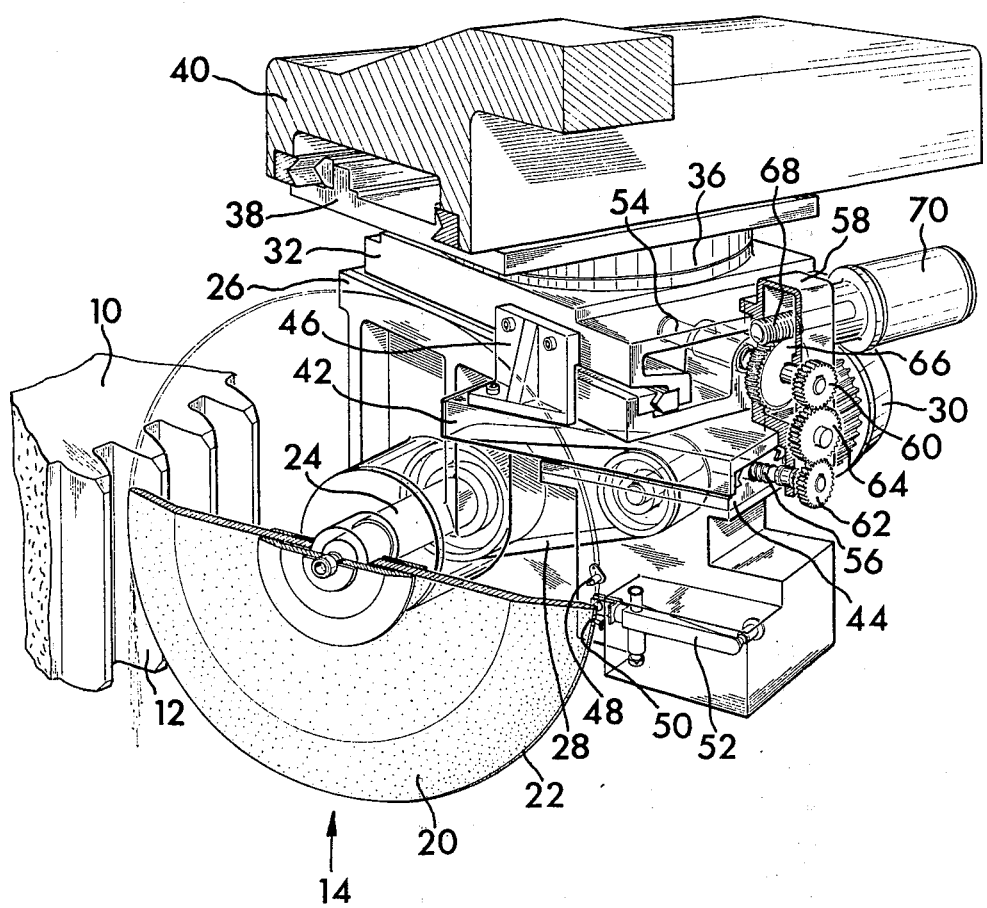
FIG. 1 is a perspective fragmentary view of a tooth flank-grinding machine for a gear according to the invention.

Describing now the drawings, it is to be understood that in FIG. 1 there has been partially illustrated only enough of the construction of a tooth flank-grinding machine, which is constructed according to the teachings of the invention, as will enable those skilled in the art to readily understand the underlying principles and concepts of the present development. Turning attention now to FIG. 1, there is illustrated therein the more important parts of the tooth flank-grinding machine of the invention which is assigned the task of grinding at a workpiece 10, for instance a gear having straight teeth, tooth flanks 12 and 12'. The left tooth flank 12, shown in the illustration of FIG. 2, has operatively associated therewith a dished grinding wheel 14, and the right tooth flank 12*, on the other hand, has operatively associated therewith a dished grinding wheel 14', which only has been partially shown in FIG. 2. Both of the grinding wheels 14 and 14', as best evident by reverting again to FIG. 2, can engage in the same tooth gap or slot between neighboring tooth flanks 12 and 12', but however also could be set such that they machine tooth flanks 12 and 12' which are separated from one another by one or a number of gear teeth. In the description to follow there will be only described details of the grinding wheel 14 and the machine parts operatively associated therewith. It is to be understood however that the same description is analogously applicable to the other grinding wheel 14'.

The grinding wheel 14 possesses a working or active end surface 16 which, in each case, acts upon one of the teeth flanks 12 at an approximately point-like work or effective grinding location 18. At the side of the grinding wheel 14 which faces away from such tooth flank 12 there is formed a substantially truncated conical-shaped rear or spine surface 20, whose generatrixes—in FIG. 2 there has been accentuated the generatrix 22* neighboring the work location 18—enclose with a plane normal to the grinding wheel axis A an angle $\delta$.

The grinding wheel 14 is attached to a grinding wheel spindle 24 which is rotatably mounted at a grinding wheel support or support member 26, yet however axially non-displaceable, and can be driven by means of a belt drive 28 or equivalent drive structure from a suitable drive motor 30 attached to the grinding wheel support 26. This grinding wheel support 26 is displaceably guided at a support guide or guide means 32 in an adjustment direction B. The grinding wheel axis A encloses with the adjustment direction B an angle in the order of $90° - \gamma$, wherein $\gamma$ is at least approximately equal to $\delta$.

The support guide means 32 is part of a support or carrier member 34 which is adjustably pivotably secured, by means of a pivot bearing 36 or equivalent structure, to a cross slide or carriage 38. This cross slide 38 is adjustably guided, in turn, at a cross-slide guide 40 essentially at right angles to the lengthwise direction of the tooth flanks 12 and 12'. This corresponds to the conventional arrangement present at gear grinding machines which grind larger size gears, such as for instance disclosed in detail in German Patent Publication No. 2,050,946 and which does not have any particular significance in the context of the invention of this application. It should be adequate to remark that the cross-slide guide 40 carries out, in relation to the workpiece 10, a number of superimposed to-and-fro movements, namely displacement movements in the lengthwise direction of the tooth flanks 12 and 12' as well as roll or generating movements which are composed of rotational movements about the axis of the workpiece 10 and tangential movements. In principle, it is immaterial which of these movements are accomplished by the workpiece 10 and which are accomplished by cross-slide guide 40, and thus by the grinding wheels 14 and 14'.

Figure 2:
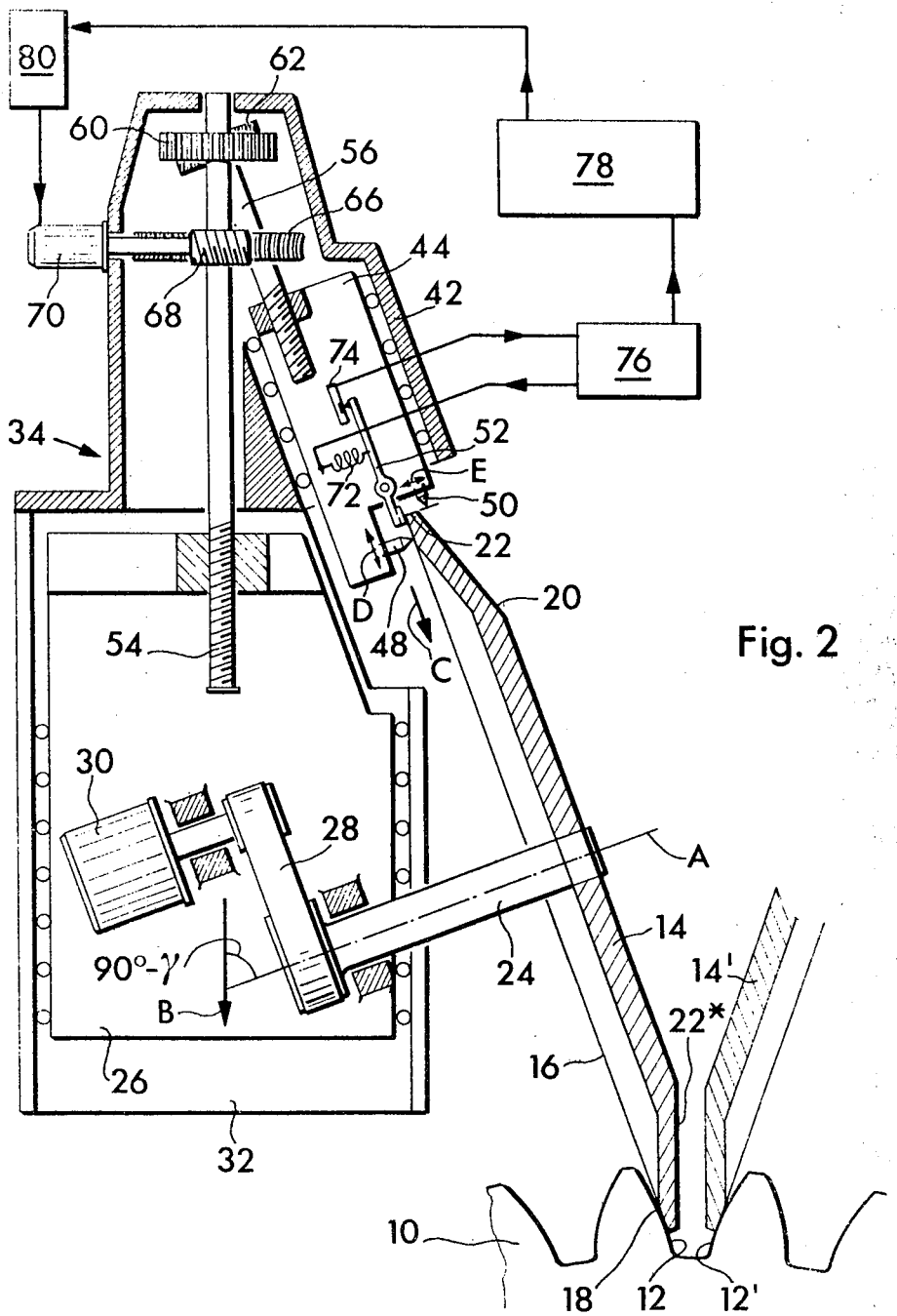
FIG. 2 is a markedly simplified schematic arrangement, shown in horizontal sectional view, of the more important components of the arrangement depicted in FIG. 1.

Belonging to the support 34, apart from the support guide 32, is a dressing carriage guide 42 which, in the exemplary illustrated embodiment, is arranged below the support guide 32. At the dressing carriage guide 42 there is displaceably guide a dressing carriage or slide 44 for movement in an adjustment direction C. The support guide 32 and the dressing carriage guide 42 are connected with one another by connection elements 46, only one of which has been particularly shown in FIG. 1 to preserve clarity in illustration, such that the adjustment directions B and C enclose with one another, in a common plane which also contains the grinding wheel axis A, the angle $\gamma$. This angle $\gamma$ coincides at least approximately with the angle $\delta$ and in the illustrated exemplary embodiment amounts to 20°. The pivot bearings or pivot bearing means 36 are constructed such that the angle of attack α can be adjusted to a different value, for instance 15°. The dressing carriage 44 carries a dressing tool 48 for the end surface 16 of the grinding wheel 14, a dressing tool 50 for the jacket surface 22 and a feeler 52 for feeling or scanning the end surface 16. The dressing tool 48, as indicated by the double-headed arrow D in FIG. 2, is movable to-and-fro in a radial plane in relation to the grinding wheel axis A, in order to periodically dress the end surface 16. In corresponding manner the dressing tool 50 can be moved to-and-fro in the direction of the double-headed arrow E, in order to dress the jacket or peripheral surface 22. The dressing tools 48 and 50 as well as the devices for their to-and-fro movements in relation to the dressing carriage 44 can be of random construction.

The grinding wheel support 26 and the dressing carriage 44 are threadably connected free of play with respective threaded spindles 54 and 56, which extend in or parallel to the related adjustment or readjustment direction B and C, respectively. Both threaded spindles 54 and 56 are mounted in a common bracket or console 58 or the like which interconnects the support guide 32 with the dressing carriage guide 42 and each carry a respective pinion 60 and 62. The pinion 60 possesses straight teeth and meshes with an intermediate gear 64, likewise possessing straight teeth, and mounted at the bracket 58. This intermediate gear 64, in turn, meshes with the pinion 62. This pinion 62 possesses helical teeth having a helix angle which coincides with the angle γ between the adjustment directions B and C, and thus, also between the threaded spindles 54 and 56. The pinion 62, which possesses helical teeth, thus forms with the intermediate gear 64, possessing straight teeth, a screw gear pair.

Affixed to the threaded spindle 54 is a worm gear 66 which can be driven by the action of a worm 68 from a stepping or indexing motor 70. Thus, there is provided a common drive for the grinding wheel support 26 and the dressing carriage 44.

The feeler or feeler member 52 is pivotably mounted in the manner of a double-arm lever at the dressing carriage 44 and is pre-biased by a spring 72, which at the same time serves for the current or power infeed, in a manner such that it strives to come into contact at its one end, in FIG. 2 its lower end, with the end surface 16 of the grinding wheel 14, and its other end with a contact 74 which in conjunction with the spring 72 forms part of a current circuit of a control unit or control 76. This control 76, in turn, is connected with a primary control device 78 which controls the stepping or indexing motor 70 by means of a control unit 80, and furthermore, controls in conventional and therefore here not furthe illustrated manner additional functions of the grinding machine, for instance the periodically occurring dressing movements of the dressing tools 48 and 50 in the direction of the double-headed arrows D and E.

Figure 3:
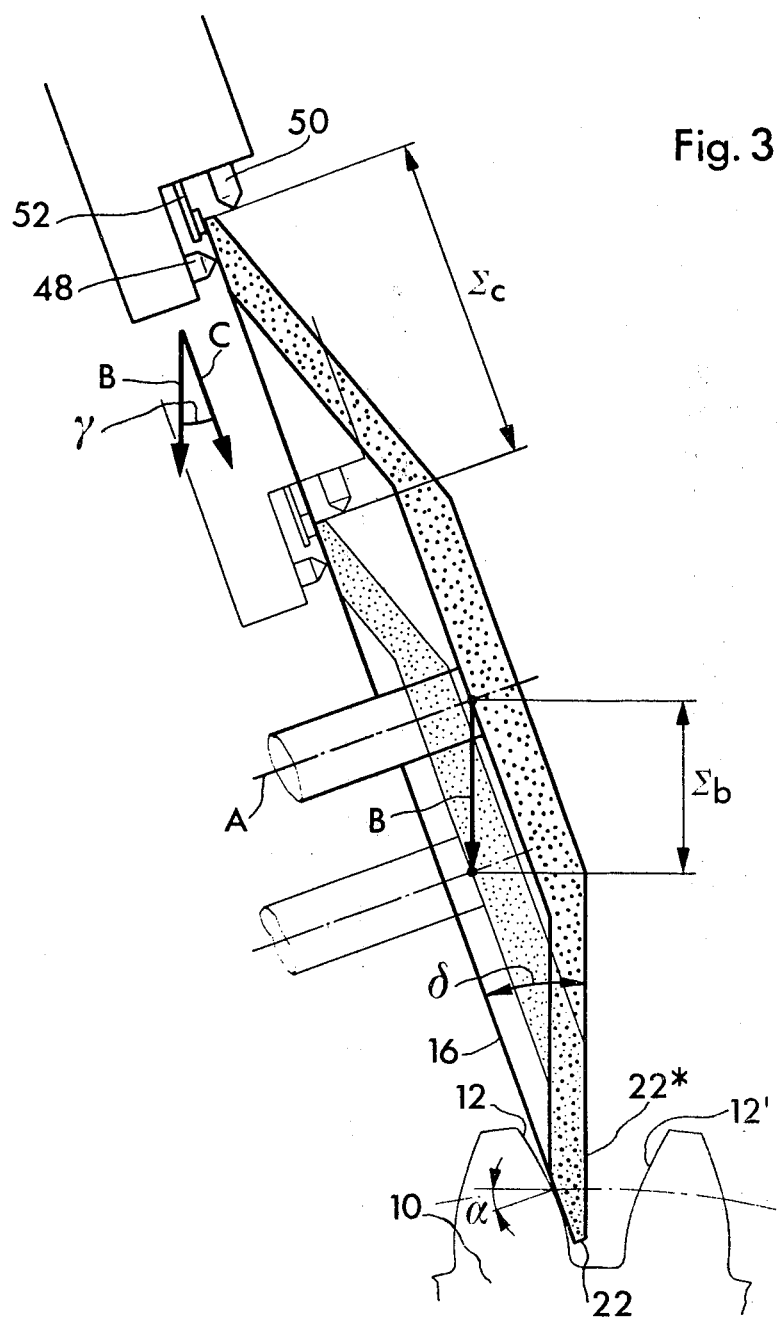
FIG. 3 illustrates on an enlarged scale details of the arrangement of FIG. 2.
Figure 4:
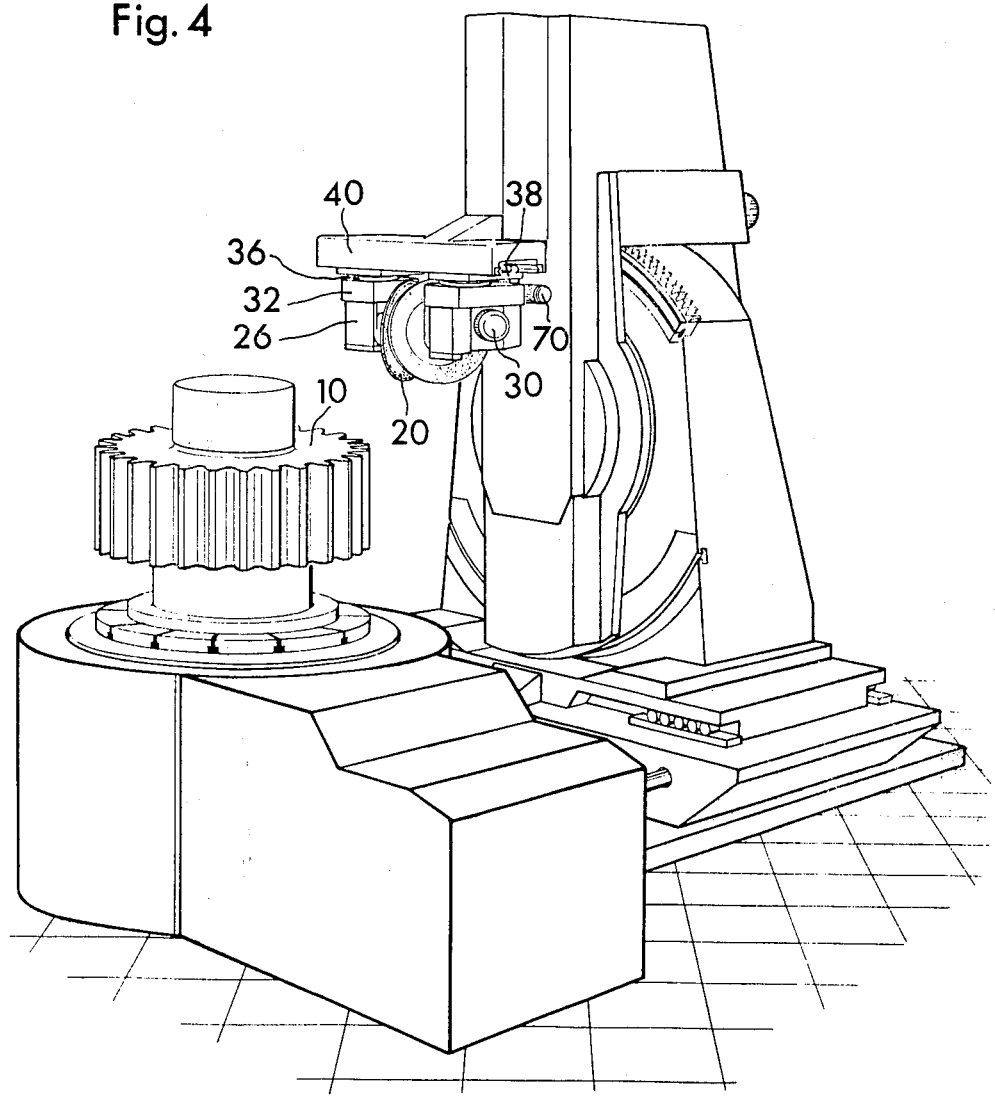
FIG. 4 is a perspective total view of the tooth flank-grinding machine depicted in FIG. 1.

After the end surface 16 of the grinding wheel 14 has been worn to such an extent that the feeler member or feeler 50 comes into contact with the contact 74, and thus closes the current circuit of the control unit 76, the latter inputs a signal to the primary control device 78 which, in turn, causes by means of the control unit or device 80 and the stepping motor 70 a common adjustment movement of the grinding wheel support 26 and the dressing carriage 44. The transmission ratio of the gearing elements located between the grinding wheel support 26 and the dressing carriage 44, namely the threaded spindles 54 and 56 as well as the pinions 60 and 62, is selected such that during each movement of the grinding wheel support 26 through the adjustment path b there occurs a movement of the dressing carriage 44 through the adjustment path c, wherein $c = 2 \cdot b \cdot \cos \gamma$. In FIG. 3 there have been illustrated the sums $\Sigma b$ and $\Sigma c$ of all adjustment paths of the grinding wheel support 26 and the dressing carriage 44, respectively, between the new condition illustrated with full lines and the used condition illustrated with thin lines of the grinding wheel 14. Of course, there also holds true for the sums the same as for the individual adjustment paths, namely:

$$\Sigma c : \Sigma b = 2 \cdot \cos \downarrow.$$

While there are shown and described present preferred embodiments of the invention, it is to be distinctly understood that the invention is not limited thereto, but may be otherwise variously embodied and practiced within the scope of the following claims. Accordingly,

What I claim is:

1. An apparatus for dressing and adjusting a dished grinding wheel at a tooth flank-grinding machine for a gear, comprising:
   an adjustable grinding wheel support;
   a grinding wheel mounted at the grinding wheel support;
   said grinding wheel having a working end surface and an outer jacket surface;
   a dressing carriage adjustable essentially radially with respect to said grinding wheel;
   two dressing tools and a feeler arranged at least approximately diametrically opposite a work location at which there is effective the grinding wheel upon a tooth flank;
   one of said dressing tools serving for dressing the working end surface of the grinding wheel;
   the other of said dressing tool serving for dressing the outer jacket surface of the grinding wheel;
   said feeler serving for scanning the working end surface of the grinding wheel;
   drive means for adjusting the grinding wheel support and the dressing carriage, with an adjustment path c of the dressing carriage being greater than an adjustment path b of the grinding wheel support;
   control means providing for said drive means and operative as a function of said feeler;
   support means for guiding said dressing carriage separately from said grinding wheel support;
   the grinding wheel support having an adjustment direction;
   the dressing carriage having an adjustment direction;
   the adjustment direction of the grinding wheel support enclosing with the adjustment direction of the dressing carriage an acute angle γ which opens in the direction of the lengthwise axis of the grinding wheel;
   said acute angle γ coinciding at least approximately with an inclination δ of a rear surface of the grinding wheel in realtion to a radial plane;
   the lengthwise axis of the grinding wheel enclosing with the adjustment direction of the grinding wheel support a complementary angle 90° − γ; and
   the adjustment path c of the dressing carriage behaving in relation to the adjustment path b of the grinding wheel support so as to satisfy the function $c:b = 2 \cdot \cos \gamma$.

2. The apparatus as defined in claim 1, wherein:
the adjustment direction of the grinding wheel support extends at least approximately parallel to that generatrix of the rear surface of the grinding wheel which most closely neighbors the work location of the grinding wheel.

* * * * *